United States Patent
Nocera (10) Patent No.: US 8,655,275 B2
(45) Date of Patent: Feb. 18, 2014

(54) DEVICE SETUP EXTENSION FOR APPLICATIONS

(75) Inventor: Bastien R. D. Nocera, Guildford (GB)

(73) Assignee: Red Hat, Inc., Raleigh, NC (US)

( * ) Notice: Subject to any disclaimer, the term of this patent is extended or adjusted under 35 U.S.C. 154(b) by 509 days.

(21) Appl. No.: 12/695,284

(22) Filed: Jan. 28, 2010

(65) Prior Publication Data

US 2011/0183613 A1      Jul. 28, 2011

(51) Int. Cl.
*H04B 7/00* (2006.01)

(52) U.S. Cl.
USPC ...... 455/41.2; 455/3.01; 455/426.1; 455/413; 455/550.1; 700/94; 709/223; 709/203; 340/3.1

(58) Field of Classification Search
USPC ................ 455/41.2, 3.01, 426.1, 413, 550.1; 700/94; 709/223, 203; 340/3.1
See application file for complete search history.

(56) References Cited

U.S. PATENT DOCUMENTS

| | | | |
|---|---|---|---|
| 6,965,770 B2* | 11/2005 | Walsh et al. | 455/426.1 |
| 7,076,207 B2* | 7/2006 | Kurosawa et al. | 455/41.2 |
| 7,111,056 B1* | 9/2006 | Ramey et al. | 709/223 |
| 2005/0239396 A1* | 10/2005 | Kreifeldt et al. | 455/3.01 |
| 2005/0239397 A1* | 10/2005 | Kreifeldt et al. | 455/3.01 |
| 2006/0258287 A1* | 11/2006 | Bidet et al. | 455/41.2 |
| 2009/0264070 A1* | 10/2009 | Lim | 455/41.2 |
| 2010/0082136 A1* | 4/2010 | Rosenblatt et al. | 700/94 |

* cited by examiner

*Primary Examiner* — April G Gonzales
(74) *Attorney, Agent, or Firm* — Lowenstein Sandler LLP (57) ABSTRACT

A first wireless device is configured to be used with a second wireless device. The configuration is performed after the first wireless device establishes a connection with the second wireless device. The first wireless device identifies services supported by the second wireless device without user intervention, and passes identified services to a plugin system in the first wireless device. The plugin system includes plugins that are associated with the identified services. The plugins present configuration options that are associated with the identified services via a user interface. From the user interface, the first wireless device receives a selection of the configuration options and is configured according to the selection.

20 Claims, 5 Drawing Sheets

DEVICE SETUP EXTENSION FOR APPLICATIONS

TECHNICAL FIELD

Embodiments of the present invention relate to wireless communications, and more specifically, to the configuration of wireless devices.

BACKGROUND

Many wireless electronic devices are capable of exchanging data over a short range distance (e.g., a few to a hundred meters) using wireless data communication protocols. One of such protocols in common use today is Bluetooth. For example, a Bluetooth-enabled headset can be connected to a mobile phone and receive the audio signals destined for the phone. A Bluetooth-enabled mouse can be connected to a computer and control the cursor movement on the computer.

For security reasons, the Bluetooth protocol defines a pairing process, which determines whether two Bluetooth-enabled devices (also referred to "Bluetooth devices") can be authenticated to wirelessly communicate with each other. In some scenarios where encrypted communication is not necessary (e.g., between a computer and a mouse), a simple association may be performed instead of pairing. Once the initial setup between the two devices has been performed, the devices can be configured to perform functions as indicated by a user. A user typically needs to locate the appropriate menu options to properly configure the devices. It can be frustrating to the user when the configuration or setup options cannot be easily found.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for configuring wireless devices. In one embodiment, the configuration is performed after a first wireless device establishes a connection with a second wireless device. The first wireless device identifies services supported by the second wireless device without user intervention, and passes identified services to a plugin system in the first wireless device. The plugin system includes plugins that are associated with the identified services. The plugins present configuration options that are associated with the identified services via a user interface. From the user interface, the first wireless device receives a selection of the configuration options and is configured according to the selection.

In one embodiment, the process of configuring the first wireless device is an extension of a setup process, during which the first wireless device establishes a connection with the second wireless device. The setup process may be either a pairing process, or a process for establishing a non-encrypted connection to the device, which then remembers the last connection. A series of screen displays guide a user through the setup process and the subsequent configuration process, and receives input from the user when necessary. The series of displays greatly simplifies device setup and configuration for the user. After the first wireless device is configured according to the user's selection, the first wireless device can communicate with the second wireless device and use the services provided by second wireless device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
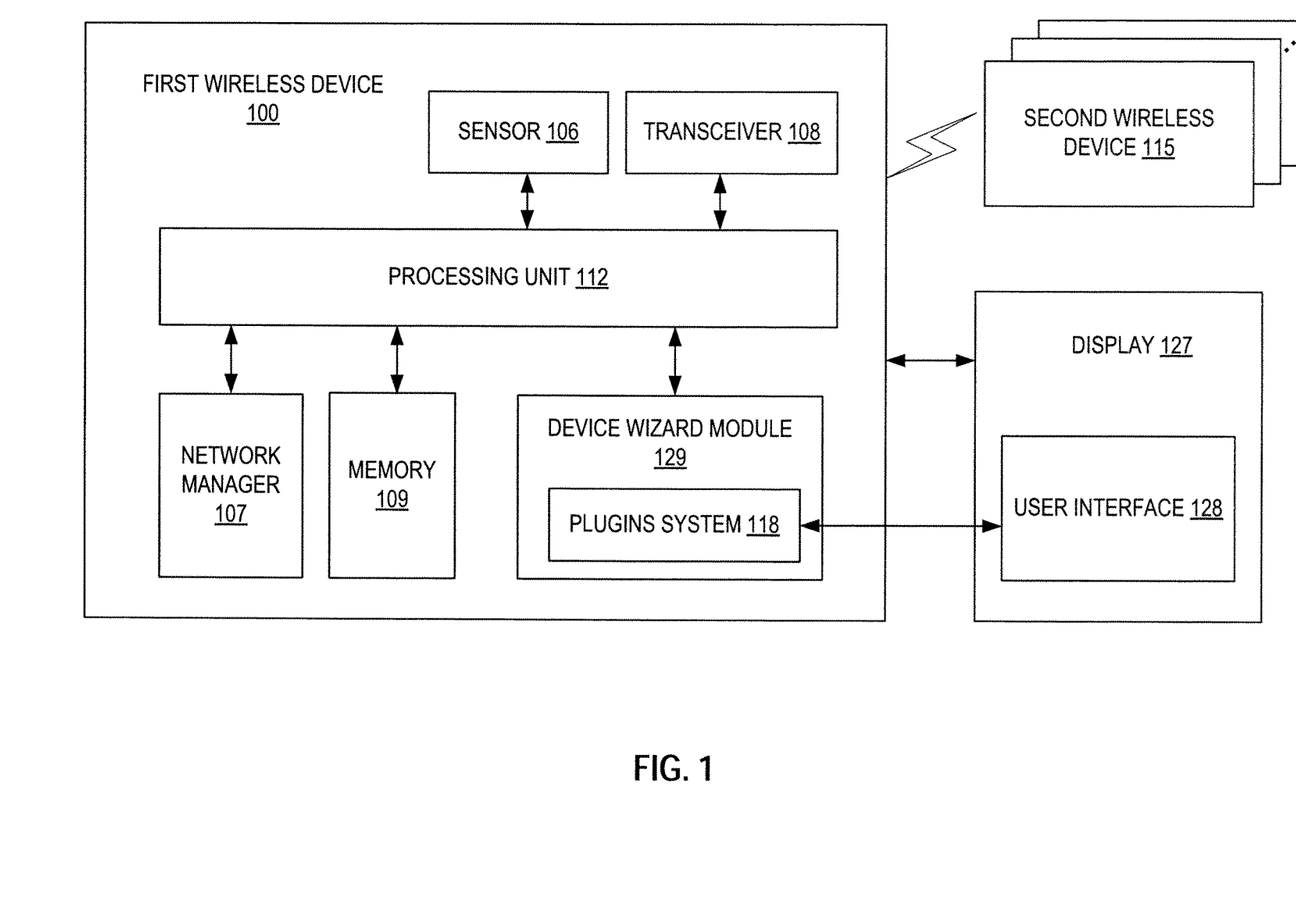
FIG. 1 is a block diagram of a wireless device which implements embodiments of the invention.

FIG. 1 illustrates an exemplary wireless device 100 which implements embodiments of the invention. The first wireless device 100 may be a computer (e.g., a server, a workstation, a personal computer (PC), a laptop, etc.), a mobile phone, a hand-held computing device, a game station, a personal digital assistant (PDA), a global positioning system (GPS) device, a printer, etc. In one embodiment, the first wireless device 100 supports a communication protocol for exchanging data wirelessly over a short range. An example of the communications protocol is Bluetooth, which is an industry standard for short-range wireless communications with low power consumption.

In one embodiment, the first wireless device 100 may also be capable of wired communications. For example, the first wireless device 100 may be connected to a wired network (e.g., a local area network (LAN), the Internet, or other private or public wired network) in addition to the short-range wireless connections. The first wireless device 100 may exchange data via the short-range wireless connections with one or more other wireless devices 115 (also referred to as "second wireless devices"), which may be a computer, a mouse, a keyboard, a headset, a phone, a PDA, a game station, a GPS device, a printer, etc.

In one embodiment, the first wireless device 100 includes processing unit 112, which may include one or more processors. The processing unit 112 executes instructions and interacts with other functional units in the first wireless device 100. The first wireless device 100 also includes a network manager 107 to manage wireless communications. Specifically, the network manager 107 performs a setup process with one or more of the second wireless devices 115 to determine which devices 115 are permitted to communicate with the first wireless device 100. The setup process may include a sequence of handshakes between the first wireless device 100 and one of the second wireless devices 115 to exchange setup information. The first wireless device 100 also includes one or more sensors 106 to detect the presence of the second wireless devices 115 within its vicinity, and a transceiver 108 to transmit wireless signals to and receive wireless signals from the second wireless devices 115. In some embodiments, the sensor 106 and the transceiver 108 may be integrated into the same piece of the unit, which switches between a sensor mode and a transceiver mode at a high rate (e.g., thousands of times per second).

In one embodiment, the first wireless device 100 is coupled to a display 127 that provides a user interface 128. The user interface 128 presents a sequence of screen displays to guide a user through the setup process and a configuration process. The display 127 may be integrated with the housing of the wireless device 100. For example, the display 127 may be a Liquid Crystal Display (LCD) with a screen or with a scrollable one-line display. The first wireless device 100 also includes a memory 109 that may be a volatile memory device (e.g., random access memory (RAM)), a non-volatile memory device (e.g., flash memory), and/or other types of memory devices.

According to one embodiment of the present invention, the first wireless device 100 includes a device wizard module 129 that supports device setup and configuration. The first wireless device 100 also includes a plugin system 118, which may be part of the device wizard module 129 (as shown in the embodiment of FIG. 1), or may be external to and in communication with the device wizard module 129. The plugin system 118 includes a number of plugins, with each plugin associated with a service (or a class of services) supported by the second wireless devices 115. In one embodiment, the first wireless device 100 and one of the second wireless devices 115 establishes a communication link by performing a setup process. After the setup process is completed, the device wizard module 129 of the first wireless device 100 passes information of the second wireless device 115 to the plugins that are associated with the services supported by the second wireless device 115. The information may include the device address (e.g., the device's unique Bluetooth address) of the second wireless device 115 and the services supported and advertised by the second wireless device 115. Additionally or alternatively, the plugins may use the device address to discover the services supported by the second wireless device 115. The plugin system 118 enables the user interface 128 to show configuration options in connection with using the services, receive user's selection of the configuration options, and configure the first wireless device 100 as directed by the user.

Illustratively, the first wireless device 100 may be a computer and the second wireless device 115 may be a mobile phone. The computer may be configured such that the mobile phone can use the computer to access the Internet. First, the computer performs a setup process with the mobile phone to exchange setup information. After the setup process is completed, the computer is capable of communicating with the mobile phone. However, a configuration process is necessary for the mobile phone to access the Internet via the computer. With the use of the device wizard module 129 and the plugin system 118, the computer automatically detects and identifies the available services provided by the mobile phone, and displays the configuration options corresponding to these services on the computer screen. The computer can provide a user interface (e.g., a series of interactive screen displays) that seamlessly integrates the device configuration process with the setup process. The series of interactive screen displays guide the user through the setup process and display configuration options to the user. By selecting one or more of the configuration options, the user can set up the computer such that the computer can communicate with the mobile phone and use the mobile phone according to the user's preferences. If, after the setup process, no configuration is necessary for the computer to use the second wireless device 115 (e.g., a mouse), the computer may display a message indicating that the setup is successful without displaying any configuration options.

As another example, a computer can be configured to be used with a GPS device. More specifically, the web browser of the computer may be configured to communicate wirelessly with the GPS device and obtain the location of the GPS device. As yet another example, a music player can be configured to connect to a wireless speaker and play music through the wireless speaker. Additionally, a computer can be configured to use a specific printer as the default printer. In one embodiment, the devices communicate with each other using the Bluetooth protocol.

In one embodiment, the plugins in the plugin system 118 can be easily added, removed, or modified to accommodate new or updated services. In one embodiment, the plugins are implemented in Linux or other Linux-based system. Other implementations may also be used. A third party application developer or a manufacture of a wireless device can develop a new application to provide a new service that is supported by the wireless device, and provide a new plugin that can be incorporated into the plugin system 118 to enable the new service. The new plugin can be designed to specifically target the new service or a class of services associated with the new service. For example, one plugin may be developed for music playing, another plugin may be developed for Internet access, and yet another plugin may be developed for positioning. These plugins may interact with the device wizard module 129 to provide configuration options that are associated with the specific services for which they are developed. When a new plugin associated with a new service is added to the plugin system 118, the plugin can present one or more new configuration options on the display 127 for the user to select. The plugins are reusable across compatible plugin systems (e.g., plugin systems that are based on the same operating system). That is, a plugin developed for a plugin system can be reused for another compatible plugin system.

Figure 2:
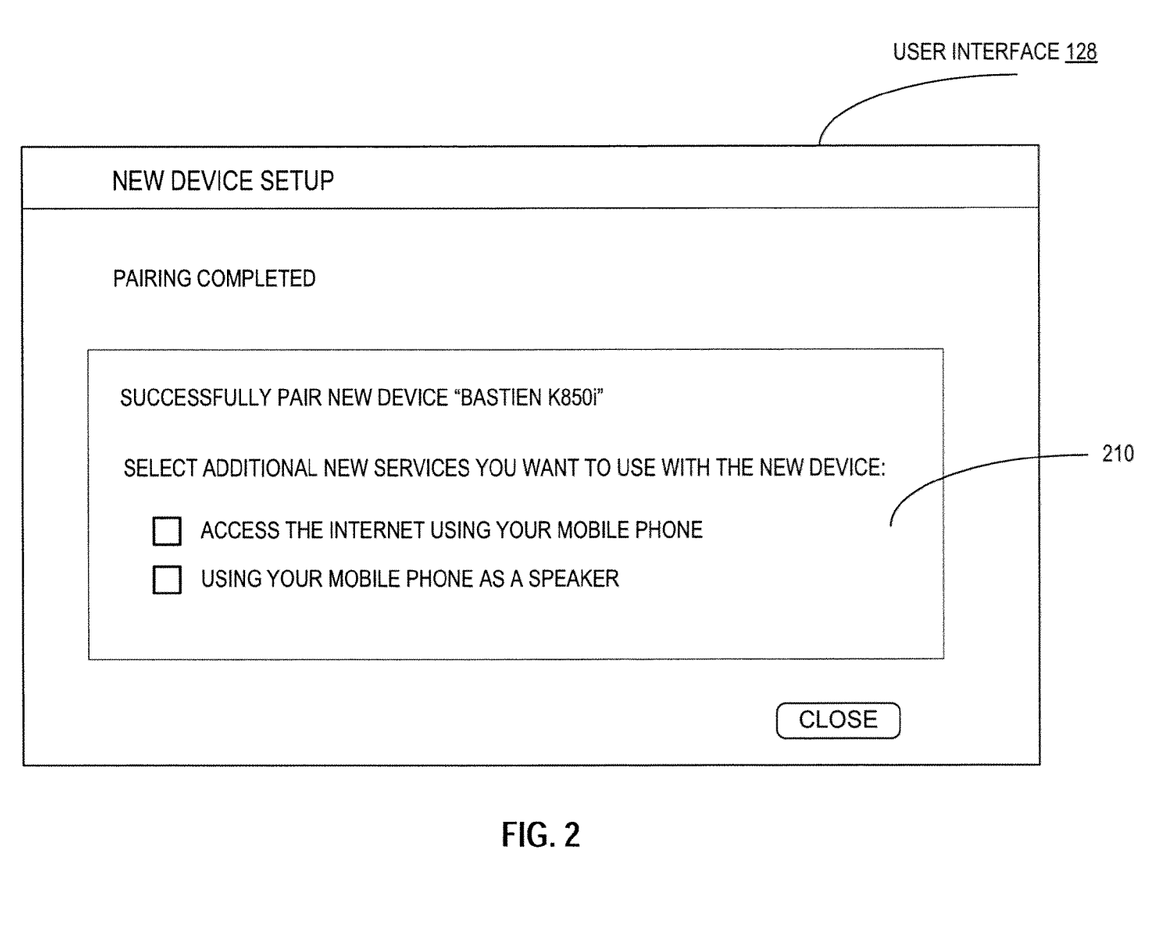
FIG. 2 is a diagram of one embodiment of a user interface displayed by the wireless device when configuration of the wireless device is necessary.

FIG. 2 illustrates an example of a screenshot of the user interface 128 for configuring the first wireless device 100. At the end of the setup process, the user interface 128 presents a window 210 that displays a list of configuration options supported by the second wireless devices 115. A user can select from the list one or more configuration options. In one embodiment, the configuration options are shown as check boxes. For example, when a computer is set up to be used with a mobile phone, the computer may be configured to allow the mobile phone to access the Internet via the computer. Additionally or alternatively, the computer may be set up to use the mobile phone as a speaker. After a user selects one or more of the check boxes, the first wireless device 100 is configured to support or use the services selected by the user.

Figure 3:
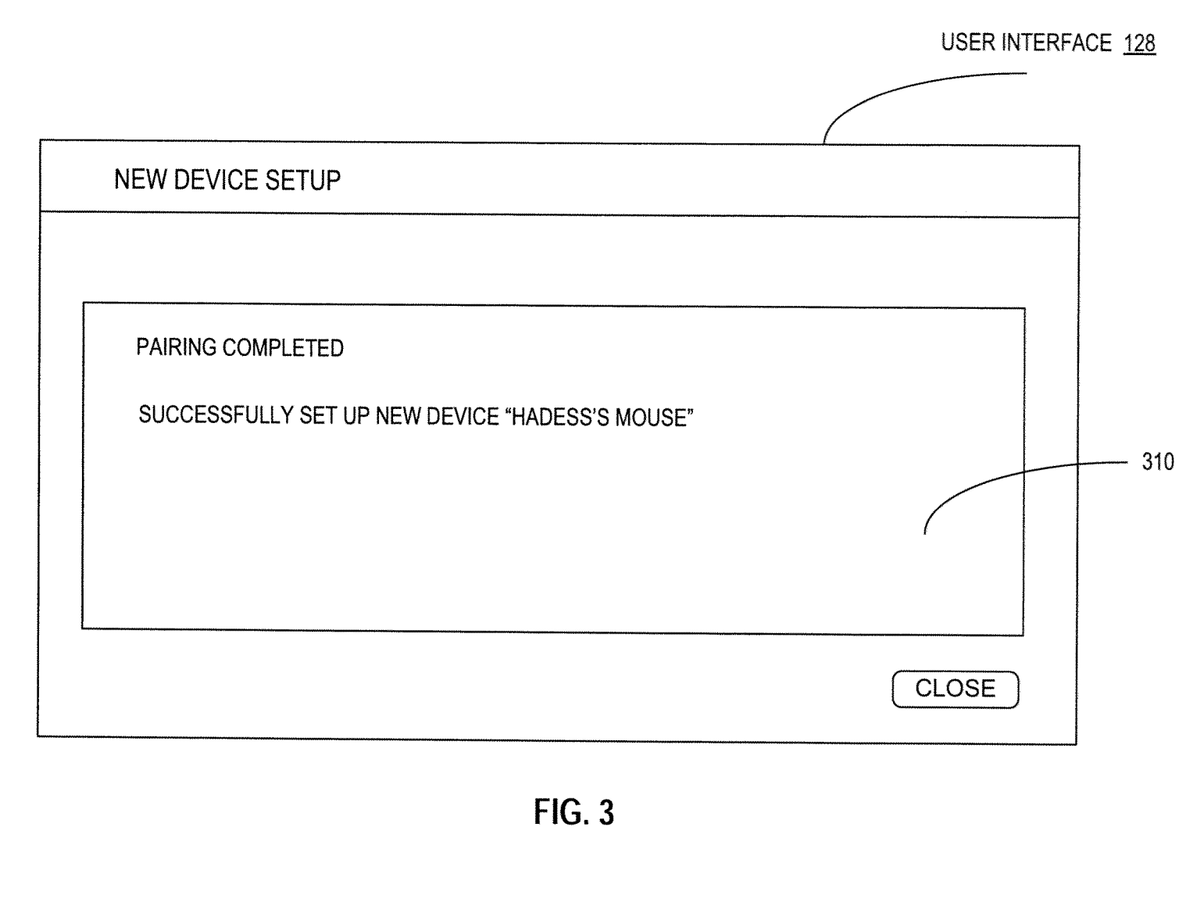
FIG. 3 is a diagram of one embodiment of a user interface displayed by the wireless device when configuration of the wireless device is not necessary.

FIG. 3 illustrates another example of a screenshot of the user interface 128 for configuring the first wireless device 100. At the end of the setup process, the user interface 128 presents a window 310 that displays a message indicating a new device (the second wireless device 115) has been successfully set up to communicate with the first wireless device 100. In this example, the first wireless device 100 is a computer and the second wireless device 115 is a wireless mouse. As the wireless mouse can be used with the computer immediately after the setup process, no further configuration of the computer is necessary. Therefore, the window 310 does not display any check boxes.

In one embodiment, the plugin system 118 enables the user interface 128 to display configuration options according to the types of the first wireless device 100 and the second wireless device 115. As illustrated by the example of FIG. 2, the plugin system 118 enables the user interface 128 to show available options for connecting a computer to a mobile phone. FIG. 3 illustrates a scenario in which a computer can use a wireless mouse immediately after setup without any additional configurations. The determination of what information to display is automatically made by the plugin system 118, based on the services automatically identified or discovered by the plugin system 118, without any user intervention.

In one embodiment, the plugin system 118 provides an additional mechanism for a user to select the configuration options of the first wireless device 100. After the above-mentioned setup and configuration processes are completed, a user may change the configuration of the first wireless device 100 at any time. For example, if the user wants to enable additional configuration options or disable existing configuration options, the user may select "preferences" from a setup menu displayed by the first wireless device 100. The first wireless device 100 may provide more than one option for a user to use the first wireless device 100 together with the second wireless device 115. The options may be determined by the services supported by the second wireless device 115, and each option may be associated with a particular property of the second wireless device 115. Illustratively, for a computer to be used with a mobile phone, the user may select the "Bluetooth network" option in the "preferences" menu on the computer (as the mobile phone communicates with the computer via a Bluetooth network). Additionally, the user may select the "audio devices" option in the "preferences" menu (as the mobile phone is also an audio device). With either option, a user is able to configure the computer to be used with the mobile phone as desired by the user.

Figure 4:
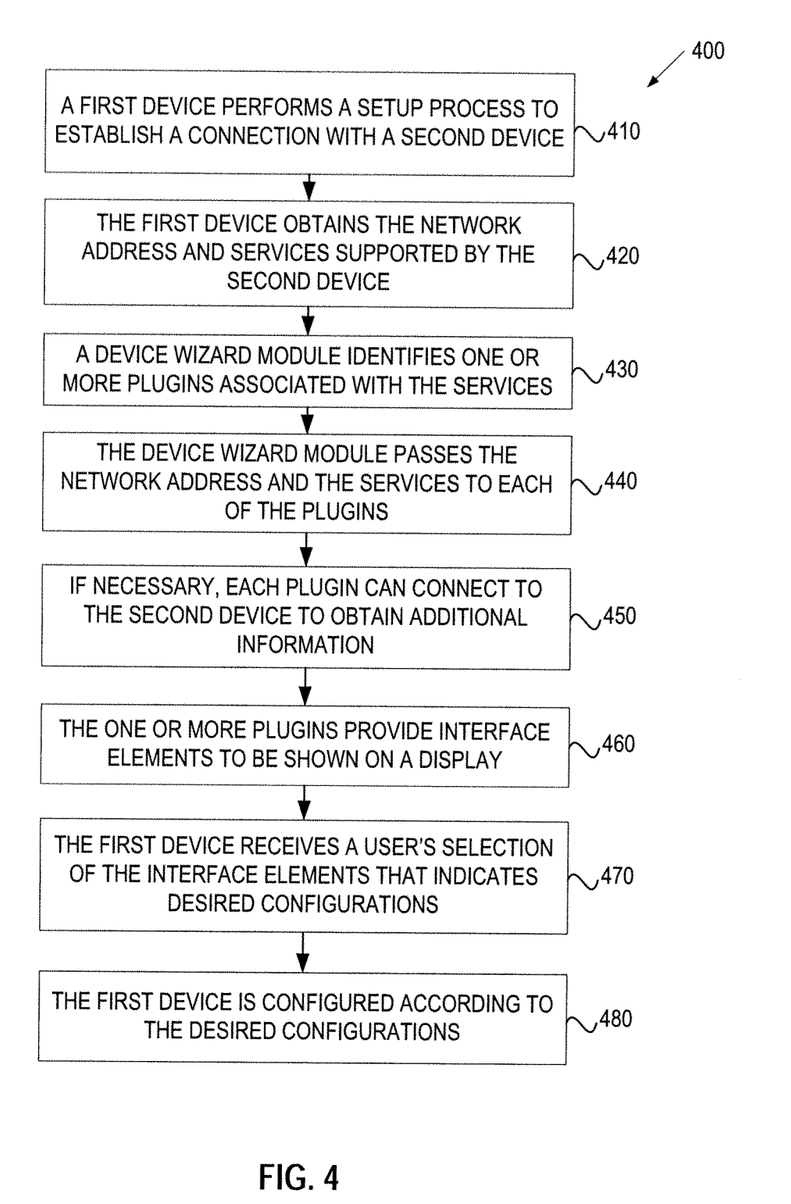
FIG. 4 is a flow diagram illustrating one embodiment of a method for device configuration.

FIG. 4 is a flow diagram illustrating one embodiment of a method 400 for setting up and configuring a wireless device for communication with another wireless device. The method 400 may be performed by computer system 500 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the first wireless device 100 of FIG. 1.

Referring to FIG. 4, in one embodiment, the method 400 begins when the first wireless device 100 performs a setup process to establish a connection with the second wireless device 115 (block 410). After the setup process is completed, the first wireless device 100 automatically obtains the device address and services (e.g., advertised services) supported by the second wireless device 115 without user intervention (block 420). The device wizard module 129 of the first wireless device 100 identifies the plugins in the plugin system 118 that are associated with the services (block 430). The device wizard module 129 then passes the device address and the services to the identified plugins (block 440). After receiving the device address and the services, each plugin can connect to the second wireless device 115 to obtain additional information (e.g., additional services supported by the second wireless device 115) if necessary (block 450).

Subsequently, each plugin provides user interface elements to be shown on a display (block 460). In one embodiment, the user interface elements include check boxes in a display window that can be selected by a user. Other user interface elements, such as buttons, pull-down menus, dialog boxes, etc., may also be used. A user may select any number of the interface elements to indicate a desired configuration. After the first wireless device 100 receives the user's selection (block 470), the first wireless device 100 is configured according to the selected configurations (block 480).

Figure 5:
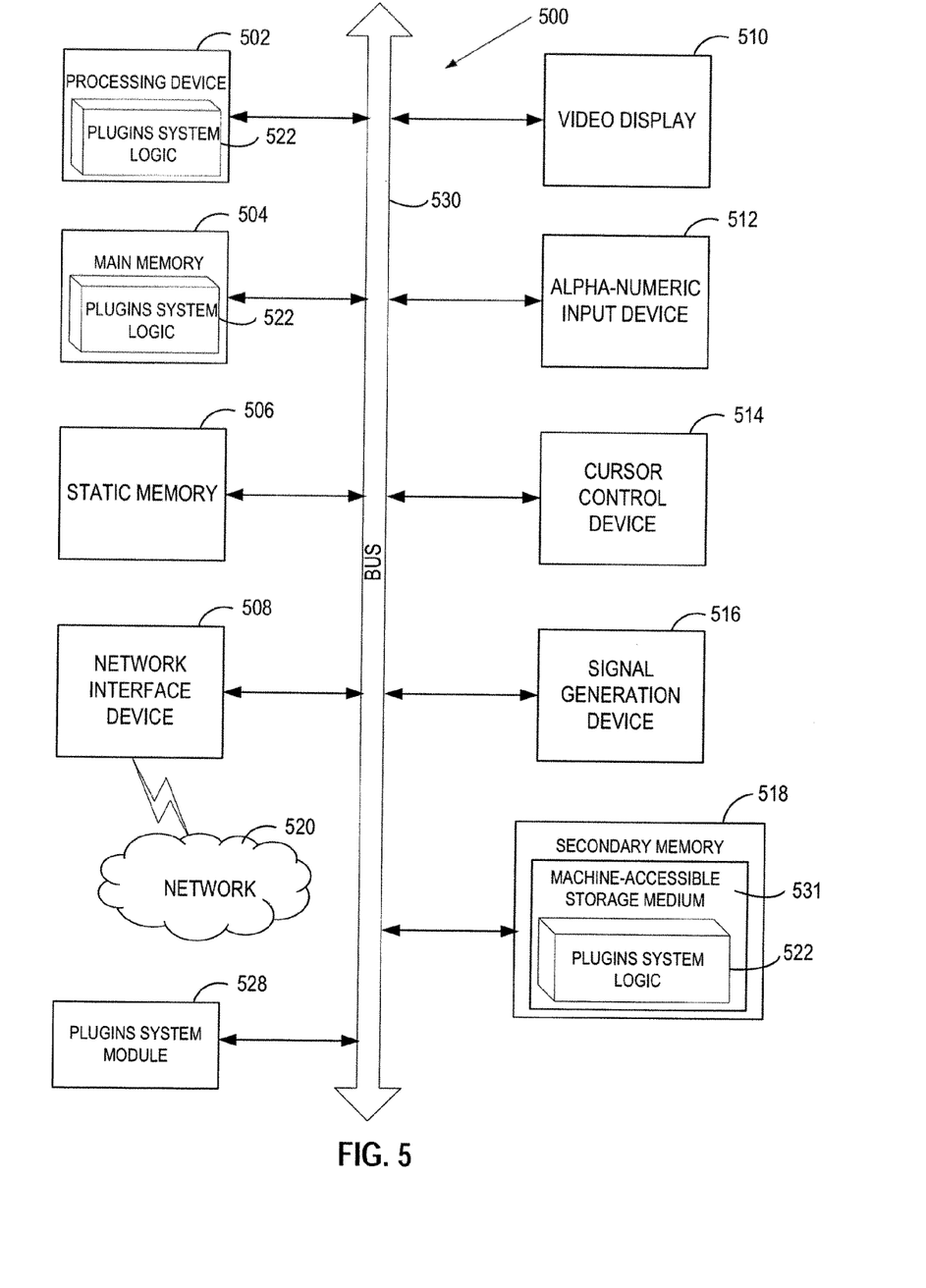
FIG. 5 illustrates a diagrammatic representation of a machine in the exemplary form of a wireless processing system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute plugin system logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., plugin system logic 522) embodying any one or more of the methodologies or functions described herein (e.g., the device wizard module 129 of FIG. 1). The plugin system logic 522 may also reside, completely or at least partially, within the main memory 504 and/or within the processing device 502 during execution thereof by the computer system 500; the main memory 504 and the processing device 502 also constituting machine-readable storage media. The plugin system logic 522 may further be transmitted or received over a network 520 via the network interface device 508.

The machine-readable storage medium 531 may also be used to store the plugin system logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 500 may additionally include a plugin system module 528 for implementing the functionalities of the plugin system 118 of FIG. 1. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "establishing", "identifying", "passing", "presenting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
  establishing, by a first wireless device, a connection with a second wireless device, wherein the first wireless device comprises a plugin;
  identifying, without user intervention, the plugin of the first wireless device associated with a service supported by the second wireless device;
  passing the service, from the second wireless device, to the identified plugin in the first wireless device;
  determining, by the identified plugin in the first wireless device, when the service necessitate configuration; and
  in response to the determining that the service necessitate configuration, presenting, by the identified plugin, a configuration option associated with the service via a user interface.

2. The method of claim 1, further comprising:
  receiving, by the plugin, a device address of the second wireless device; and
  discovering additional information of the second wireless device using the device address before presenting the configuration option.

3. The method of claim 1, further comprising:
  configuring the first wireless device according to a user selection of the configuration option.

4. The method of claim 1, further comprising:
  displaying a plurality of options in a menu for configuring the first wireless device to be used with the second wireless device, each option associated with a property of the second wireless device.

5. The method of claim 1, further comprising:
  incorporating a new plugin into a plugin system, the new plugin associated with a new service supported by the second wireless device, wherein the plugin system comprising the plugin; and
  presenting, by the new plugin, a new configuration option associated with the new service via the user interface.

6. The method of claim 1, further comprising:
guiding a user through a setup process via the user interface; and
subsequent to the setup process, presenting a selectable items on the user interface to allow the user to select the configuration option.

7. The method of claim 1, wherein passing the services to identified plugin further comprises:
determining, by the identified plugin, whether the service necessitate configuration; and
in response to the determining that the service does not necessitate configuration, presenting a message indicating setup success without presenting the configuration option.

8. A system comprising:
a display; and
a first wireless device coupled to the display and connected to a second wireless device, the first wireless device comprising:
a plugin;
a wizard module to identify, without user intervention, the plugin of the first wireless device associated with a services supported by the second wireless device, and to pass the service, from the second wireless device, to the identified plugin in the first wireless device, wherein the identified plugin in the first wireless device determines when the services necessitate configuration, and in response to the determine that the service necessitate configuration, the identified plugin presents configuration option associated with the service via a user interface.

9. The system of claim 8 further comprising:
a plugin system to receive an indication of the service from the wizard module, the plugin system comprising the plugin, wherein the wizard module provides a device address and advertised service of the second wireless device to the plugin system.

10. The system of claim 9, wherein the plugin system discovers additional information of the second wireless device using the device address.

11. The system of claim 8, wherein the first wireless device is configured according to a selection of the configuration option.

12. The system of claim 8, wherein the display presents a plurality of options in a menu for configuring the first wireless device to be used with the second wireless device, each option associated with a property of the second wireless device.

13. The system of claim 8, wherein the plugin is reusable across compatible plugin systems.

14. A non-transitory computer readable storage medium including instructions that, when executed by a processing system, cause the processing system to perform a method comprising:

establishing, by a first wireless device, a connection with a second wireless device, wherein the first wireless device comprises a plugin;
identifying, without user intervention, the plugin of the first wireless device associated with a service supported by the second wireless device;
passing the service, from the second wireless device, to the identified plugin in the first wireless device;
determining, by the identified plugin in the first wireless device, when the service necessitate configuration; and
in response to the determining that the service necessitate configuration, presenting, by the identified plugin, a configuration option associated with the service via a user interface.

15. The non-transitory computer readable storage medium of claim 14, wherein the method further comprises:
receiving, by the plugin, a device address of the second wireless device; and
discovering additional information of the second wireless device using the device address before presenting the configuration option.

16. The non-transitory computer readable storage medium of claim 14, wherein the method further comprises:
configuring the first wireless device according to a user selection of the configuration option.

17. The non-transitory computer readable storage medium of claim 14, wherein the method further comprises:
displaying a plurality of options in a menu for configuring the first wireless device to be used with the second wireless device, each option associated with a property of the second wireless device.

18. The non-transitory computer readable storage medium of claim 14, wherein the method further comprises:
incorporating a new plugin into a plugin system, the new plugin associated with a new service supported by the second wireless device, wherein the plugin system comprising the plugin; and
presenting, by the new plugin, a new configuration option associated with the new service via the user interface.

19. The non-transitory computer readable storage medium of claim 14, wherein the method further comprises:
guiding a user through a setup process via the user interface; and
subsequent to the setup process, presenting a selectable items on the user interface to allow the user to select the configuration option.

20. The non-transitory computer readable storage medium of claim 14, wherein the method further comprises:
determining, by the identified plugin, whether the service necessitate configuration; and
in response to the determining that the service does not necessitate configuration, presenting a message indicating setup success without presenting the configuration option.

\* \* \* \* \*

UNITED STATES PATENT AND TRADEMARK OFFICE
CERTIFICATE OF CORRECTION

PATENT NO. : 8,655,275 B2
APPLICATION NO. : 12/695284
DATED : February 18, 2014
INVENTOR(S) : Bastien R. D. Nocera It is certified that error appears in the above-identified patent and that said Letters Patent is hereby corrected as shown below:

In the Claims

In claim 6, column 9, line 5, before "on" delete "items" and replace with --item--.

In claim 8, column 9, lines 23-24, before "supported" delete "services" and replace with --service--.

In claim 19, column 10, line 45, delete "items" and replace with --item--.

Signed and Sealed this
Ninth Day of September, 2014

Michelle K. Lee
*Deputy Director of the United States Patent and Trademark Office*